(12) United States Patent
Carlson

(10) Patent No.: US 6,172,795 B1
(45) Date of Patent: Jan. 9, 2001

(54) OPTICAL SHUTTER DEVICE

(75) Inventor: Steven A Carlson, Cambridge, MA (US)

(73) Assignee: Cambridge Scientific, Inc., Cambridge, MA (US)

(*) Notice: Under 35 U.S.C. 154(b), the term of this patent shall be extended for 0 days.

(21) Appl. No.: 08/866,178

(22) Filed: May 30, 1997

(51) Int. Cl.$^7$ .................................................. G02B 26/00
(52) U.S. Cl. ........................ 359/290; 359/265; 359/275; 359/290
(58) Field of Search .................................. 359/265, 275, 359/241, 290, 289

(56) References Cited

U.S. PATENT DOCUMENTS

| | | | |
|---|---|---|---|
| 3,584,934 | * 6/1971 | French | 350/160 |
| 3,629,100 | 12/1971 | Hersh | 252/300 |
| 3,964,823 | 6/1976 | Trozzolo | 350/160 P |
| 3,984,177 | 10/1976 | Trozzolo | 350/160 P |
| 4,085,999 | 4/1978 | Chahroudi | 350/1.1 |
| 4,795,240 | * 1/1989 | Wong et al. | 350/353 |
| 4,835,475 | 5/1989 | Hanakura et al. | 324/435 |
| 4,916,211 | 4/1990 | Rubner | 528/480 |
| 4,933,110 | 6/1990 | Tucker | 252/582 |
| 5,052,820 | 10/1991 | McGinniss et al. | 374/131 |
| 5,091,984 | 2/1992 | Kobayashi et al. | 385/16 |
| 5,139,926 | 8/1992 | Liu | 430/346 |
| 5,139,927 | 8/1992 | Liu et al. | 430/346 |
| 5,153,106 | 10/1992 | Liu | 430/340 |
| 5,232,820 | 8/1993 | Lewis et al. | 430/338 |
| 5,252,256 | 10/1993 | Tutt et al. | 252/582 |
| 5,268,245 | 12/1993 | Chiulli | 430/7 |
| 5,271,872 | 12/1993 | Sallavanti et al. | 252/582 |
| 5,303,256 | 4/1994 | Sumida | 372/106 |
| 5,377,042 | 12/1994 | Chahroudi | 359/241 |
| 5,406,407 | 4/1995 | Wolff | 359/326 |
| 5,426,143 | 6/1995 | deWit et al. | 524/206 |
| 5,434,699 | 7/1995 | Berkovic et al. | 359/328 |
| 5,472,786 | 12/1995 | Pannell et al. | 428/447 |
| 5,506,708 | 4/1996 | Harrison et al. | 359/103 |
| 5,510,200 | 4/1996 | Ashwell | 428/704 |
| 5,525,430 | * 6/1996 | Chahroudi | 428/620 |
| 5,581,300 | 12/1996 | Kim | 348/297 |
| 5,604,626 | * 2/1997 | Teowee et al. | 359/265 |
| 5,644,416 | 7/1997 | Morikawa et al. | 349/86 |
| 5,739,947 | 4/1998 | Wood et al. | 359/299 |
| 5,757,525 | 5/1998 | Rao et al. | 359/108 |

OTHER PUBLICATIONS

Chen et al., "Application of Ultrafast Temperature Jump Spectroscopy to Condensed Phase Molecular Dynamics" 1992, J. Phys. Chem, vol. 96, pp. 7178–7186.

Seilmeier et al. "Relaxation of Vibrational Energy In Polyatomic Molecules Incorporated in a Plastic Matrix," 1986, J. Phys. Chem., vol. 90, pp. 104–108.

Seilmeier et al., "Ultrafast Energy Dissipation in Solutions Measured by a Molecular Thermometer," Mar. 1984, Chemical Physics Letters, vol. 105, pp. 140–146.

Seilmeier et al., "Ultrafast Intramolecular Redistribution and Intermolecular Relaxation of Vibrational Energy in Large Molecules," Feb. 1984, Chemical Physics Letters, vol. 104, pp. 121–128.

Wen et al., "Multiphonon up–pumping and Molecular Hot Spots in Superheated Polymers Studied by Ultrafast Optical Calorimetry," May 1992, Chemical Physics Letters, vol. 192, pp. 315–320.

Lee et al., "Direct Measurment of Polymer Temperature During Laser Ablation Using a Molecular Thermometer," Sep. 1992, J. Appl. Physics, vol. 72, pp. 2440–2448.

Wen et al., "Ultrafast Temperature Jump in Polymers: Phonons and Vibrations Heat Up At Different Rates," Sep. 1993, J. Chem. Physics, vol. 99, pp. 4140–4151.

Tolbert et al., "High–Speed Color Imaging by Laser Ablation Transfer With a Dynamic Release Layer: Fundamental Mechanism," Jul. 1993, Journal of Imaging Science and Technology, vol. 37, pp. 411–421.

Lee et al., "Dynamics of Laser Ablation Transfer Imaging Investigated by Ultrafast Microscopy," Mar. 1992, Journal of Imaging Science and Technology, vol. 36, pp. 180–187.

Sutherland, "Handbook of Nonlinear Optics," 1996, Marcel Dekker, New York, Chapter 9, "Nonlinear Absorption," pp. 497, 522–548.

\* cited by examiner

*Primary Examiner*—Georgia Epps
*Assistant Examiner*—Timothy Thompson
(74) *Attorney, Agent, or Firm*—Sampson & Associates, P.C.

(57) ABSTRACT

The present invention pertains to an optical shutter device comprising one or more photon absorbing materials that convert photons to heat in less than 1 nanosecond and one or more thermochromic materials that undergo an increase or decrease in optical density at one or more wavelengths when the thermochromic material is heated from 25° C. to a temperature greater than 100° C. in less than 1 nanosecond.

35 Claims, No Drawings

OPTICAL SHUTTER DEVICE

FIELD OF THE INVENTION

This invention relates to the field of thermochromic materials and to applications for thermochromic materials where the response time for the optical absorption change of the thermochromic material is required to be extremely fast, e.g., 1 nanosecond or less.

BACKGROUND OF THE INVENTION

With the increasing availability of lasers, including pulsed lasers which produce very high intensities of optical radiation in pulses of short duration such as 1 nanosecond or less, it has become possible to develop many different new optical applications which operate on a time scale ranging from less than 0.1 picoseconds or 0.0001 nanoseconds up to 1 nanosecond. Examples of these applications are high speed optical communication and computing, optical data recording, security devices, and high speed imaging. The very high intensities of the optical radiation in very short exposure times also creates a need for protective devices which can shield eyes and mechanical sensors from excessive optical radiation. U.S. Pat. No. 4,933,110 to Tucker describes an optical shield for protection from lasers.

In many of these laser-based applications, there is a need for optical devices which change their optical transmission or optical density properties depending on the presence or absence of the laser radiation. Optical density, as used herein, is defined as $\log_{10}(1/\text{transmittance})$ for transmitted radiation. For example, with the protective devices, the optical transmission needs to reduce to an extremely low level, e.g., less than 0.01% for protecting the eyes of humans, at the wavelength of the incident laser radiation in a very short time before the cumulative optical radiation exposure causes damage to the eye, e.g., more than 0.5 microjoules/cm$^2$. For example, in optical communications, typically involving the use of optical fibers, optical devices are used to modulate the laser signals at response times on the order of 1 picosecond.

Because of the extremely fast nature of these laser-based applications with time scales of less than a picosecond to 1 nanosecond, a variety of materials with different types of optical properties have been used to change the transmission properties of the laser radiation when passing through the devices of these applications. Materials which change their optical transmission properties upon undergoing a chemical change have not been suitable for these applications because of the long time scale of chemical reactions, e.g., 1000 nanoseconds or 1 microsecond up to seconds and minutes. This includes photochromic and conventional thermochromic materials, which undergo an optical absorption change due to a change in chemical structure when exposed to photons and heat, respectively. U.S. Pat. No. 5,091,984 to Kobayashi et al. describes an example of photochromic materials. U.S. Pat. No. 5,426,143 to de Wit et al. describes an example of conventional thermochromic materials. Another disadvantage of optical materials that depend on a chemical reaction to produce a useful optical change is that it is difficult to make them reversible over many thousands and more of optical changes. This is well known to be true for photochromic and thermochromic materials. Most high speed optical applications require very efficient reversibility because, by the nature of many repeat optical operations in 1 nanosecond or less time periods, they require millions and more of repeat optical changes during their useful life.

These requirements for very fast optical response times and for repeated reversibility have combined to make materials with a variety of nonlinear optical properties evaluated for use in these applications. These nonlinear optical materials do not typically undergo any chemical change during the optical change and are reversible in their change in optical properties. The optical nature of the change allows it to occur in typically less than 1 picosecond. Examples of the nonlinear optical changes are changes in optical transmission or absorption, changes in frequency of the laser radiation, and changes in the index of refraction. U.S. Pat. No. 5,472,786 to Pannell et al. describes optical switching materials based on changes in the index of refraction. Although these materials have found use in various high speed laser applications, many of them are inorganic materials and are difficult to fabricate into optical devices such as in a coated layer on a flexible substrate or in a plastic molded material. U.S. Pat. No. 5,406,407 to Wolff describes an optical switching device based on an inorganic material. Some of the nonlinear optical materials are difficult to fabricate into devices because their performance requires many extremely thin layers, e.g. dozens of layers only one or two molecular diameters thick for each layer, in order to provide an adequate nonlinear optical effect. Also, the magnitude of the optical changes with these nonlinear optical materials is often small, particularly for changes in optical transmission so that applications that would benefit from a large change in optical transmission, e.g., an optical shutter or eye and sensor protection devices, can not be readily done.

Therefore it is an object of this invention to provide an optical shutter which has a large change in optical transmission when exposed to a high intensity of photons in a very short period of time, such as 1 nanosecond or less.

It is a further object of this invention to provide an optical shutter for laser applications which is reversible and can be used repeatedly without degradation.

It is another object of this invention to provide an optical shutter that requires only 1 to 5 layers of materials and that can be fabricated using economical coating, plastic molding, and other conventional processes.

These and other objects of this invention will become more apparent from the following description of the invention.

SUMMARY OF THE INVENTION

The present invention provides an optical shutter device comprising one or more photon absorbing materials that convert photons to heat in less than 1 nanosecond and one or more thermochromic materials that undergo an increase or decrease of greater than 5% in optical density at one or more wavelengths when the thermochromic material is heated from 25° C. to a temperature greater than 100° C. in less than 1 nanosecond.

In one embodiment, the thermochromic material is reversible. In one preferred embodiment, the reversible thermochromic material increases or decreases its optical density at one or more wavelengths without undergoing a chemical change. The change in its optical density is from a shift in the optical absorption spectrum of the thermochromic material at elevated temperatures. In a most preferred embodiment, the thermochromic material is selected from the group consisting of tris (p-dialkylaminophenyl) aminium salts and phthalocyanine compounds. In one preferred embodiment, the thermochromic material has a molar extinction coefficient of greater than 20,000 M$^{-1}$ cm$^{-1}$ at 25° C. at one or more wavelengths over the range of 300 to 1500 nm. In a most preferred embodiment, the thermochromic material has a molar extinction coefficient of greater than 50,000 $M^{-1}$ $cm^{-1}$ at 25° C. at one or more wavelengths over the range of 300 to 1500 nm.

In one embodiment, the increase or decrease of the optical density of the thermochromic material upon heating is greater than 50% at one or more wavelengths. In one preferred embodiment, the increase or decrease of the optical density of the thermochromic material upon heating is greater than 100%. In one preferred embodiment, the increase or decrease of the optical density of the thermochromic material upon heating is greater than 200%. In a most preferred embodiment, the increase or decrease of the optical density of the thermochromic material upon heating is greater than 400%, and particularly greater than 600%.

In one embodiment, the wavelengths of increase or decrease of the optical density of the thermochromic material are selected from the visible region of 400 to 700 nm. In one embodiment, the increase in the optical density at one or more wavelengths of this visible absorption region is greater than 100%. In a preferred embodiment, the increase in the optical density at one or more wavelengths of this visible absorption region is greater than 200%. In a most preferred embodiment, the increase in the optical density at one or more wavelengths of this visible absorption region is greater than 400%, and particularly greater than 600%.

In one embodiment, the increase or decrease of the optical density of the thermochromic material of greater than 5% at one or more wavelengths occurs when the thermochromic material is heated from 25° C. to a temperature greater than 100° C. in less than 0.1 nanoseconds. In a preferred embodiment, the photon absorbing material used with this thermochromic material converts absorbed photons to heat in less than 0.1 nanoseconds.

In a preferred embodiment, the increase or decrease of the optical density of the thermochromic material of greater than 5% at one or more wavelengths occurs when the thermochromic material is heated from 25° C. to a temperature greater than 100° C. in less than 0.01 nanoseconds. In a most preferred embodiment, the photon absorbing material used with this thermochromic material converts photons to heat in less than 0.01 nanoseconds.

In a most preferred embodiment, the increase or decrease of the optical density of the thermochromic material of greater than 5% at one or more wavelengths occurs when the thermochromic material is heated from 25° C. to a temperature greater than 100° C. in less than 0.001 nanoseconds. In a particularly most preferred embodiment, the photon absorbing material used with this thermochromic material converts photons to heat in less than 0.001 nanoseconds.

In one embodiment, the optical density at all wavelengths over the range of 400 to 700 nm is greater than 2.0 when the photon flux intensity in the visible region is greater than 1 MW /$cm^2$ while the visible luminous transmission is about 10% or more in the absence of laser radiation. In a preferred embodiment, the optical density at all wavelengths over the range of 400 to 700 nm is greater than 3.0 when the photon flux intensity in the visible region is greater than 1 MW/$cm^2$ while the visible luminous transmission is about 10% or more in the absence of laser radiation. In a most preferred embodiment, the optical density at all wavelengths over the range of 400 to 700 nm is greater than 4.0 when the photon flux intensity in the visible region is greater than 1 MW/$cm^2$ while the visible luminous transmission is about 10% or more in the absence of laser radiation.

In one embodiment, the photon absorbing materials are selected from the group consisting of metals, carbons, graphites, and iminium compounds. In a preferred embodiment, the photon absorbing materials comprise one or more layers of aluminum. In a most preferred embodiment, the thermochromic material is in one or more layers that are adjacent to the layers of aluminum.

In one embodiment, the photon absorbing materials are selected from the group consisting of carbon blacks and carbon fibers In one embodiment, the photon absorbing material is present in one layer of the optical shutter device and the thermochromic material is present in a second adjacent layer of the device. In a preferred embodiment, the photon absorbing material is in one or more layers which are adjacent to two or more layers of the thermochromic material. In a most preferred embodiment, the photon absorbing material and the thermochromic material are present together in one or more layers of the device.

In one embodiment, the photon absorbing material converts absorbed photons to heat in less than 0.1 nanoseconds. In a preferred embodiment, the photon absorbing material converts absorbed photons to heat in less than 0.01 nanoseconds. In a most preferred embodiment, the photon absorbing material converts absorbed photons to heat in less than 0.001 nanoseconds. In a particularly most preferred embodiment, the photon absorbing material converts absorbed photons to heat in less than 0.0002 nanoseconds or 0.2 picoseconds.

In a preferred embodiment, the optical shutter device further comprises one or more optical limiting materials selected from the group consisting of second order nonlinear materials and third order nonlinear optical materials. In a most preferred embodiment, the optical limiting material comprises reverse saturable absorbers.

DETAILED DESCRIPTION OF THE INVENTION

In many applications for lasers, it is desirable to operate at very high speeds with response times on the order of a few picoseconds or, in other cases, to have a response which is only activated by the intensity of a laser for a very short exposure time, but is not activated by lower intensity exposures to photons, such as ambient sunlight conditions. Having response times of a nanosecond down to less than a picosecond depending on the application has resulted in the use of materials that rely on electronic transitions for the optical response to photons since the time scale is too short for chemical reactions.

One type of optical response desired in many laser-based applications is a change in optical absorption at one or more wavelengths within the desired time frame, which is often on the order of a few picoseconds. This change in optical absorption can be a decrease or an increase. The general effect is that of an optical shutter. For example, the shutter can be "open" with a low optical absorption or high optical transmission at certain wavelengths before any laser exposure. When exposed to the laser for a very short period, such as 0.01 nanoseconds, the shutter becomes "closed" with a higher optical absorption at these wavelengths. Preferably, after the laser exposure ends, the optical shutter returns very rapidly to its original "open" state and has a completely reversible mode of operation.

One of the more demanding applications for an optical shutter is eye protection from lasers operating at wavelengths in the visible region. In this application, such as for industrial workers or for military personnel, it is necessary to have a moderate optical absorption, such as 10 to 50% luminous transmission, in the visible wavelength region so the personnel can see through the eyewear. However, in the case of eye exposure to lasers operating at visible wavelengths in the region of 400 to 700 nm, the optical absorption needs to exceed an optical density of more than 4, or an optical transmission of less than 0.01%, as rapidly as possible, preferably a few picoseconds or less, to prevent or minimize eye damage. This application thus requires a 1,000 to 5,000-fold decrease in optical transmission in a very short time period of a nanosecond or less depending on the intensity of the laser.

One of the less demanding applications for an optical shutter is security marking. For example, the optical shutter can be in the form of text or graphics printed on the item requiring security protection, such as a credit card, and can be in the "open" state of no discernible visible absorption under ambient room and sunlight conditions. Upon exposure to a laser of suitable intensity and wavelength, the optical shutter will go to its "closed" state of easily discernible visible absorption. The specific color shade of this "closed" state can be selected to enhance the security protection. After the laser exposure is over, the optical shutter would return to its "open" state. The time for this to occur can also be selected, e.g., instantly or a few seconds, to further enhance the security protection.

Another application for an optical shutter is for optical communication and optical computing. For example, before laser exposure, the optical shutter is in the "open" state with a specific optical absorption at one or more selected wavelengths. Upon exposure to the laser, the optical shutter goes to its "closed" state with an increased or decreased optical absorption at the selected wavelengths. The optical system has optical detectors which measure optical absorption and can distinguish between the "open" and "closed" states. After exposure to the laser, typically operating in a pulsed mode, the optical shutter returns to its "open" state. In this example, an optical detector can determine whether the optical shutter is "open" or "closed" and thus can input this information to govern the operation of the optical system.

In another example of the use of an optical shutter in an optical communication system, the optical shutter can be "open" and allow the transmission of laser radiation at a certain wavelength or of a certain intensity. However, if the optical shutter is exposed to laser radiation of a different wavelength or of an increased intensity, it can go to the "closed" state where it prevents the transmission of laser radiation of the certain wavelength or intensity. For example, in fiber optic communications, a 1,550 nm wavelength is commonly used. An optical shutter could be "open" and allow transmission of this wavelength. When the optical shutter is exposed to a frequency doubled laser radiation of 775 nm, it could go to its "closed" state and prevent the transmission of the 1,550 nm wavelength. After the exposure to the 775 nm laser radiation ends, the optical shutter would return to its "open" state.

Optical materials which rely upon electronic transitions in their use in applications for optical shutters are generally able to operate in the extremely fast time periods of a nanosecond or less due to the nature of their electronic transitions. However, the typically low magnitude of their optical absorption changes and the complexity of their fabrication to maximize the optical effects, e.g., often requiring molecular orientation, multiple layers of different materials with thicknesses of only a few molecular diameters for each layer, and high electrical conductivity, make them inadequate for the more demanding applications for optical shutters.

This invention overcomes the disadvantages of purely optical materials by utilizing a combination of optical materials and processes with thermal or heat processes. This retains the extremely fast response times needed for the various laser-based applications because the thermal or heat processes can occur in the time frame of a few picoseconds or less. At the same time, the present invention utilizes the thermal or heat processes to provide a new optical material at an elevated temperature that has a different optical absorption spectrum than at 25° C. or other lower temperatures. This change in the optical absorption in the heated thermochromic material provides the "optical shutter" effect. Since the change in optical absorption is induced by heating to elevated temperatures in excess of 100° C. but does not require any change in chemical structure, this type of thermochromic material with no chemical reaction when heated is a unique class of thermochromic materials.

The optical shutter device of the present invention comprises one or more photon absorbing materials that convert photons to heat in less than 1 nanosecond and one or more thermochromic materials that undergo an increase or decrease of greater than 5% in optical density at one or more wavelengths when the thermochromic material is heated from 25° C. to a temperature greater than 100° C. in less than 1 nanosecond. Procedures which can be used to measure the time for the photon absorbing materials of the present invention to convert photons to heat and to measure the change in optical density for thermochromic materials of the present invention at one or more wavelengths upon heating to a temperature of 100° C. or more in 1 nanosecond or less are described in *J. Imaging Sci. and Tech.*, Vol. 37, pp. 411–421 (1993) by Tolbert et al., and references therein, all of which are fully incorporated herein by reference; and are described in *J. Chem. Phys.*, Vol. 99, pp. 4140–4151 by Wen et al., and references therein, all of which are fully incorporated herein by reference. This combination of materials and their properties allows the optical shutter device to undergo a change in optical absorption within a time period of 1 nanosecond or less.

PHOTON ABSORBING MATERIALS

Lasers operate at a wide variety of wavelengths extending across the ultraviolet (UV), visible, and infrared (IR) regions with wavelengths from about 300 nm to above 10,000 nm. The photon absorbing materials of the present invention absorb the photons of the specific laser. By "photon absorbing" or "optical absorption" is meant, as used herein, that the photon is absorbed by the material and raises the material to a higher electronic state or excited state above its initial electronic state, typically referred to as the ground state.

From this higher electronic or excited state, the material releases the absorbed energy in a basic variety of ways: radiationless conversion to heat; radiation emission such as fluorescence or phosphorescence; or chemical reaction. Sometimes these processes that release energy involve a transfer from the initial excited state to a second excited state, e.g., excited singlet to excited triplet state transfer. Typically, these excited state transfer processes take place on a time frame of greater than 1 nanosecond and would be outside the time parameter of the present invention. Similarly, photo-induced chemical reactions typically take place on a time frame of greater than 1 nanosecond, often on the time scale of microseconds and seconds, and fall outside the time parameter of the present invention. Also, photoinduced chemical reactions are usually not reversible so they are undesirable for most applications for optical shutters because reversibility of the optical shutter and repeated use of the photon absorbing material is required. Fluorescence emission can occur in less than 1 nanosecond from the time of photon absorption but it does not directly produce heat. Some fluorescence emission can be acceptable if it does not significantly lower the amount of heat produced and if it is consistent with good reversibility. The preferred photon absorbing material undergoes rapid internal conversion from the first excited state, usually the first excited singlet state, to the initial electronic or ground state to produce heat and to return the photon absorbing material to a state where it is ready to absorb another photon of the laser radiation.

Thus, the photon absorbing material acts as a heat forming material when it absorbs photons. As discussed herein, this can result in localized temperatures in the optical shutter device that are above 300° C. and can exceed 700° C. or more. Since these temperatures are reached during the time period of the laser radiation and readily cool by conventional heat transfer with the surroundings, if the duration of the laser radiation is not too long, e.g., less than 1,000 nanoseconds, it is possible to operate in a non-equilibrium thermal state at the elevated temperatures for these very short time periods where the photon absorbing material remains stable at temperatures well above its thermal decomposition temperature under equilibrium thermal conditions.

The photon absorbing materials of the present invention form heat in 1 nanosecond or less from the time of photon absorption. Decreasing the time to much less than 1 nanosecond to internally convert the absorbed photon energy to heat and to be ready to absorb another photon is preferred for the photon absorbing materials. In one embodiment, the photon absorbing materials convert absorbed photons to heat in less than 0.1 nanoseconds. Preferred are photon absorbing materials that convert absorbed photons to heat in less than 0.01 nanoseconds. Most preferred are photon absorbing materials that convert photons to heat in less than 0.001 nanoseconds. Particularly most preferred are photon absorbing materials that convert photons to heat in less than 0.0002 nanoseconds or 0.2 picoseconds.

For example, a photon absorbing material that converts photons to heat in 0.0001 nanoseconds or 0.1 picosecond would be able to absorb and convert 10,000 photons to heat per molecule of photon absorbing material within the time period of 1 nanosecond. This has obvious advantages for developing elevated temperatures in the region of the photon absorbing materials in very short time periods of much less than 1 nanosecond and to having reasonably low amounts of photon absorbing materials which can absorb high intensities of laser radiation.

Examples of the photon absorbing materials of the present invention include metals, carbons, graphites, and tris (p-dialkylaminophenyl) aminium salts. One preferred metal is aluminum. Preferred carbons are carbon blacks and carbon fibers. A preferred aminium salt is tris (p-dibutylaminophenyl) aminium hexafluoroantimonate, available as IR-165 from Deloz Safety, Lakeland, Fla. IR-165 is also called N, N, N', N' tetrakis (p-dibutylaminophenyl) p-benzoquinone bis(iminium) hexafluoroantimonate..

It is preferred that the photon absorbing materials have a high molar extinction coefficient at the wavelength of the laser radiation. This lowers the amount of photon absorbing material needed for efficient absorption and allows the use of the photon absorbing material in thinner and more concentrated layers where the localized elevated temperatures from the conversion of photons to heat can be reached more quickly and to higher levels. For some applications, such as eye protection, the wavelength of the visible laser radiation may not be known so optical absorption from the photon absorbing materials is needed at all possible visible wavelengths for the laser radiation. The metals, carbons, graphites, and iminium compounds are well suited for these applications since they have optical absorption at all wavelengths from 200 to 1500 nm with the metals, carbons, and graphites absorbing at all laser wavelengths.

THERMOCHROMIC MATERIALS

Thermochromic materials undergo an change in optical absorption when heated. Usually this results from a chemical change caused by the heat. Examples of this are leuco dyes in combination with acid generating compounds, as described for example in U.S. Pat. No. 4,835,475 to Hanakura et al., and spiropyran compounds. As noted above with photo-induced chemical reactions, thermal-induced chemical reactions require more than 1 nanosecond to occur and are outside the time parameter of the present invention. Also, thermochromic reactions are usually not reversible and, if not reversible, do not provide this desired property for an optical shutter.

To function in the optical shutter of the present invention, the thermochromic material needs to change its optical absorption in less than 1 nanosecond from the time it is heated from 25° C. to a temperature greater than 100° C. Because of the very short time period for the absorption change, it is likely that the thermochromic material will utilize only an electronic change or transition to change its absorption spectrum rather than utilizing any type of chemical reaction. The preferred type of thermochromic material in the present invention shifts its optical absorption due to absorption of a photon from one of the higher thermal levels of the ground state that is occupied due to the elevated temperature, such as 100° C. or higher, of the thermochromic material. The heat formed by the photon absorbing material rapidly transfers to surrounding materials, including the thermochromic materials of the present invention. These thermochromic materials at elevated temperatures have a shift in optical absorption at one or more wavelengths that can be utilized in the optical shutter device of the present invention. Typically, this shift in optical absorption is to longer wavelengths, a so-called "red" shift, due to lower energy photon absorption transitions from the higher thermal states of the ground state. It is possible to have thermochromic materials of the present invention which shift their optical absorption spectra to shorter wavelengths, a so-called "blue" shift, when heated to elevated temperatures during the time periods of 1 nanosecond or less of the present invention. An increase or decrease of 5% or greater in the optical density at one or more wavelengths due to the thermochromic material can be utilized in an optical shutter device.

It is desirable that the thermochromic material involves a reversible mechanism when changing its absorption spectrum. The thermochromic properties based on a shift in optical absorption spectrum when heated to elevated temperatures do not require a chemical reaction and are consistent with a reversible mechanism.

It is preferred that the thermochromic material has a molar extinction coefficient of greater than 20,000 $M^{-1} cm^{-1}$ at 25° C. at one or more wavelengths in the region of 300 to 1500 nm. This reduces the amount of thermochromic material that is needed to provide the desired change in optical density in comparison to thermochromic materials with lower molar extinction coefficients. Also, it makes it easier to incorporate the thermochromic materials at high concentrations in relatively thin layers so that the heat transfer to the thermochromic material from the photon absorbing material can be more efficient and higher localized temperatures of the thermochromic material in the minimum time period can be reached. It is most preferred that the thermochromic material has a molar extinction coefficient of greater than 50,000 $M^{-1}$ $cm^{-1}$ at 25° C. at one or more wavelengths in the range of 300 to 1500 nm.

For some applications for an optical shutter, it is desirable to have an increase or decrease of 50% or greater in the optical density at one or more wavelengths when the thermochromic material is heated from 25° C. to a temperature greater than 100° C. in less than 1 nanosecond. It is preferred that this increase or decrease in the optical density is 100% or greater. It is most preferred that this increase or decrease in optical density is 200% or greater. It is particularly most preferred if this increase or decrease in optical density is 400% or greater, and more particularly, 600% or greater.

One approach to achieve these higher changes in optical density is to increase the temperature that the thermochromic material reaches. This typically increases the change in optical density in a linear or nearly linear fashion such that, for example, increasing the temperature of the thermochromic material from 25° C. to 200° C. might increase the optical density at one or more wavelengths by 100% and a further increase in temperature to 375° C. might further increase the optical density at one or more wavelengths by 200% compared to that at 25° C. Further increases in temperature would further increase the per cent change in the optical density.

In order to shorten the response time of the optical shutter, it is preferred that the optical density of the thermochromic material increases or decreases by 5% or greater at one or more wavelengths when the thermochromic material is heated from 25° C. to a temperature greater than 100° C. in less than 0.1 nanoseconds. It is most preferred if the time period for this increase or decrease in the optical density of the thermochromic material upon heating is less than 0.01 nanoseconds. It is particularly most preferred if the time period for this increase or decrease in the optical density of the thermochromic material upon heating is less than 0.001 nanoseconds. It is also particularly most preferred if the time for the photon absorbing material to convert photons to heat is similar to or less than the time for the thermochromic material to show the increase or decrease of 5% or greater in optical density when heated from 25° C. to a temperature greater than 100° C.

Examples of the thermochromic materials of the present invention include tris (p-dialkylaminophenyl) aminium salts and phthalocyanine compounds. Suitable phthalocyanine compounds are described in U.S. Pat. No. 5,506,708 to Harrison, et al. One preferred thermochromic material is tris (p-dibutylaminophenyl) aminium hexafluoroantimonate. It has a molar extinction coefficient of 84,400 $M^{-1}$ $cm^{-1}$ at 1064 nm in polymethyl methacrylate polymer, as described in *J. Chem. Phys.*, Vol. 99, pp. 4140–4151 (1993) by Wen et al.

OPTICAL SHUTTER CONSTRUCTIONS

There are a wide variety of ways that the photon absorbing materials and the thermochromic materials of the present invention can be combined to provide an optical shutter device. In the one embodiment, the photon absorbing materials and the thermochromic materials are present together in one or more layers of the optical shutter. For example, 30 weight per cent of an ultrafine carbon black powder, such as Shawingun Acetylene Black or SAB, as the photon absorbing material and 15 weight per cent of an aminium salt, such as IR-165, as the thermochromic material could be combined with 55 weight per cent of one or more polymeric binder materials and coated or molded by conventional methods to provide an optical shutter with one or more active layers. Since the optical shutter operates by a change in optical density which is additive over the total number of layers used to construct the optical shutter, considerations of optimizing the conversion of photons to heat and the rapid buildup of localized elevated temperatures, of ease and cost of fabrication, and of the specific laser-based application dictate the choice of the number of layers. A single layer can be used as well as multiple layers well in excess of 10 layers.

Since iminium compounds and some other thermochromic materials of this invention are typically also useful as photon absorbing materials of the present invention, it is possible to utilize them as the single active material for both the necessary photon absorbing and thermochromic properties. Usually, it is preferred to select an optimum photon absorbing material and an optimum thermochromic material, that is different from the photon absorbing material, in order to make the optimum optical shutter for the specific laser-based application.

When the photon absorbing layer is a layer of a metal, such as a 30 angstrom thick layer of aluminum, it is usually not possible to incorporate the thermochromic material in this metal layer. Since the heat transfer from the ultrathin metal layer to an adjacent organic layer occurs efficiently in a few picoseconds, the thermochromic material, such as 40 weight per cent of IR-165 or a phthalocyanine compound, can be combined with 60 weight per cent of one or more polymeric binders into a thin layer, typically less than 1 micron in thickness in order to increase the rate of heating, adjacent to one or both sides of the aluminum layer. If the thermochromic material, such as IR-165, also acts as a photon absorbing material, this can supplement the heating effect from the aluminum layer. Also, an additional photon absorbing material, such as carbon fibers with diameters of less than 0.2 microns and lengths greater than 1 micron, can be added to the layers containing thermochromic materials. The ultrathin aluminum layer typically reflects 20 to 30% of the laser radiation and transmits 30 to 60% so it is useful to have photon absorbing materials in the layers adjacent to the aluminum layer to convert some of these photons to heat for use in heating the thermochromic materials.

Instead of a metal as a separate layer of a photon absorbing material, it is possible to use any of the other photon absorbing materials, such as the carbon fibers, in a separate layer adjacent to one or more layers containing one or more thermochromic materials.

For laser-based applications such as eye protection from visible lasers and security marking, it is desirable to have the optical shutter have a large increase, such as 100%, in optical density at one or more wavelengths in the visible region of 400 to 700 nm. It is preferred if this increase in optical density is greater than 200%. It is most preferred if this increase in optical density is greater than 400%, and particularly greater than 600%. For these applications, the optical density at wavelengths outside of the visible region in the absence of laser radiation can be greater than 4 or whatever density that is needed for the particular application, such as for eye protection from lasers.

For eye protection from visible lasers, the protective eyewear needs to permit adequate vision in the absence of laser radiation. It is desirable that this vision be a high luminar transmission, such as 70% or higher, in the visible region. It is known to incorporate UV absorbers and IR absorbers which provide adequate laser protection in the UV and IR regions due to optical densities of 4 or greater across these regions while also providing adequate transmission in the visible region. However, in order to provide a "trigger" in the case of laser radiation in the visible wavelength range, there needs to be optical absorption across the visible wavelength region which initiates a process to increase the optical density in the visible region to a high level. This optical absorption in the visible region that acts as a "trigger" to provide the optical shuttle effect needs to be high enough to quickly, preferably in a few picoseconds, cause development of the protective optical absorption. Thus, instead of the desired visible luminous transmission of 50 to 70% or higher, it may be necessary to compromise between visibility and very fast protection time by reducing the visible luminous transmission to about 10%.

On the average across the visible wavelength region, when the visible luminous transmission is about 10% or greater, the optical density would average about 1.0 or less in the absence of laser radiation. As the laser radiation intensity progressively increases to levels, such as 1 MW/cm$^2$, that require eye protection in a picosecond response time, the optical density of the optical shutter of the present invention increases to 2.0 or greater across all wavelengths of the visible region. It is preferred that this optical density of the optical shutter is 3.0 or greater across all the wavelengths of the visible region. It is most preferred that this increase of the optical density of the optical shutter is 4.0 or greater across all wavelengths of the visible region.

To further enhance the high speed operation of the optical shutter device and its utility for laser protective eyewear, one or more of the photon absorbing materials of the present invention has a sharp absorption peak near the center of the visible wavelength range. Preferably, this absorption peak coincides with a key laser radiation wavelength that requires protection for the eyes, such as 532 nm. U.S. Pat. No. 5,271,872 to Sallavanti et al. describes a suitable photon absorbing porphyrin material for absorbing 532 nm laser radiation. If this absorption peak is narrow, the visible luminous transmission can still be about 10% or greater in spite of this narrow section in the middle of the visible range that has an optical transmission as low as 1% or less. Another advantage of this approach of a photon absorbing material in the center of the visible wavelength range is that the entire visible region can reach very high optical densities as an optical shutter more easily because the one or more thermochromic materials has less of the visible region that requires rapid development of very high optical absorption. For example, one thermochromic material can be a UV absorber with high molar extinction coefficients, such as 50,000 M$^{-1}$ cm$^{-1}$, in the near UV wavelength region which, upon very fast heating to an elevated temperature such as 300° C., develops optical absorption in the visible range from 400 nm out to the middle of the range, such as 532 nm. A second thermochromic material can be an IR absorber with high molar extinction coefficients, such as 50,000 M$^{-1}$ cm$^{-1}$, in the near IR wavelength region which, upon very fast heating to elevated temperatures, develops optical absorption in the visible range from 700 nm down to the middle of the range, such as 532 nm. In this example, a thermochromic material of the present invention does not have to develop strong optical absorption across the entire visible wavelength range, but only needs to develop strong optical absorption across one-half or less of the visible wavelength range The optical shutter device of the present invention may further comprise one or more nonlinear optical materials that supplement the optical limiting performance of the optical shutter either in a separate layer of nonlinear optical materials independent of the materials for this optical shutter or present in the same layers with one or both of the photon absorbing materials or thermochromic materials of the present invention. The unique high temperatures in a very short time period may significantly enhance the optical limiting properties of these nonlinear optical materials. For example, at 300° C. or greater under these non-equilibrium thermal conditions of a nanosecond or less for heat development, a number of nonlinear optical materials may develop enhanced optical limiting properties not present at temperatures at or near 25° C. Examples of nonlinear optical (NLO) materials for use in the optical shutter of the present invention include second order NLO materials and third order NLO materials. Suitable second order NLO materials and third order NLO materials include those described in the *Handbook of Nonlinear* Optics by Richard L. Sutherland (Marcel Dekker, New York, 1996). A preferred NLO material comprises a reverse saturable absorber.

In the claims:

1. An optical shutter device comprising:
   (a) one or more photon absorbing materials, wherein said photon absorbing material converts absorbed photons to heat in less than 1 nanosecond; and
   (b) one or more thermochromic materials, wherein the optical density of said thermochromic material increases or decreases by greater than 5% at one or more wavelengths when said thermochromic material is heated from 25° C. to a temperature greater than 100° C. in less than 1 nanosecond.

2. The device of claim 1, wherein said thermochromic material is reversible.

3. The device of claim 2, wherein the change in the optical density of said reversible thermochromic material is from a shift in the optical absorption spectrum of said thermochromic material in a heated state without undergoing a chemical change.

4. The device of claim 2, wherein the thermochromic material is selected from the group consisting of: tris (p-dialkylaminophenyl) aminium salts and phthalocyanine compounds.

5. The device of claim 2, wherein said thermochromic material has a molar extinction coefficient of greater than 20,000 M$^{-1}$ cm$^{-1}$ at 25° C. at one or more wavelengths selected from the range consisting of: 300 to 1500 nm.

6. The device of claim 2, wherein said thermochromic material has a molar extinction coefficient of greater than 50,000 M$^{-1}$ cm$^{-1}$ at 25° C. at one or more wavelengths selected from the range consisting of: 300 to 1500 nm.

7. The device of claim 1, wherein the increase or decrease of the optical density of said thermochromic material is greater than 50% at one or more wavelengths when said thermochromic material is heated from about 25° C. to a temperature greater than 100° C. in less than 1 nanosecond.

8. The device of claim 1, wherein the increase or decrease of the optical density of said thermochromic material is greater than 100% at one or more wavelengths when said thermochromic material is heated from about 25° C. to a temperature greater than 100° C. in less than 1 nanosecond.

9. The device of claim 1, wherein the increase or decrease of the optical density of said thermochromic material is greater than 200% at one or more wavelengths when said thermochromic material is heated from about 25° C. to a temperature greater than 100° C. in less than 1 nanosecond.

10. The device of claim 1, wherein the increase or decrease of the optical density of said thermochromic material is greater than 400% at one or more wavelengths when said thermochromic material is heated from about 25° C. to a temperature greater than 100° C. in less than 1 nanosecond.

11. The device of claim 1, wherein the increase or decrease of the optical density of said thermochromic material is greater than 600% at one or more wavelengths when said thermochromic material is heated from about 25° C. to a temperature greater than 100° C. in less than 1 nanosecond.

12. The device of claim 1, wherein said one or more wavelengths are selected from the range consisting of: 400 to 700 nm.

13. The device of claim 12, wherein the optical density of said thermochromic material increases by greater than 100% when said thermochromic material is heated from 25° C. to a temperature greater than 100° C. in less than 1 nanosecond.

14. The device of claim 12, wherein the optical density of said thermochromic material increases by greater than 200% when said thermochromic material is heated from 25° C. to a temperature greater than 100° C. in less than 1 nanosecond.

15. The device of claim 12, wherein the optical density of said thermochromic material increases by greater than 400% when said thermochromic material is heated from 25° C. to a temperature greater than 100° C. in less than 1 nanosecond.

16. The device of claim 12, wherein the optical density of said thermochromic material increases by greater than 600% when said thermochromic material is heated from 25° C. to a temperature greater than 100° C. in less than 1 nanosecond.

17. The device of claim 1, wherein the optical density of said thermochromic material increases or decreases by greater than 5% at one or more wavelengths when said thermochromic material is heated from 25° C. to a temperature greater than 100° C. in less than 0.1 nanoseconds.

18. The device of claim 17, wherein said photon absorbing material converts absorbed photons to heat in less than 0.1 nanoseconds.

19. The device of claim 1, wherein the optical density of said thermochromic material increases or decreases by greater than 5% at one or more wavelengths when said thermochromic material is heated from 25° C. to a temperature greater than 100° C. in less than 0.01 nanoseconds.

20. The device of claim 19, wherein said photon absorbing material converts absorbed photons to heat in less than 0.01 nanoseconds.

21. The device of claim 1, wherein the optical density of said thermochromic material increases or decreases by greater than 5% at one or more wavelengths when said thermochromic material is heated from 25° C. to a temperature greater than 100° C. in less than 0.001 nanoseconds.

22. The device of claim 21, wherein said photon absorbing material converts absorbed photons to heat in less than 0.001 nanoseconds.

23. The device of claim 1, wherein said photon absorbing materials are selected from the group consisting of: metals, carbons, graphites, and tris (p-dialylaminophenyl) aminium salts.

24. The device of claim 1, wherein said photon absorbing materials comprise one or more layers of aluminum.

25. The device of claim 24, wherein said thermochromic material is in one or more layers that are adjacent to said layers of aluminum.

26. The device of claim 1, wherein said photon absorbing material is selected from the group consisting of carbon blacks and carbon fibers.

27. The device of claim 26, wherein said photon absorbing material is in one or more layers which are adjacent to one or more layers comprising said thermochromic material.

28. The device of claim 1, wherein said photon absorbing material and said thermochromic material are present together in one or more layers of said device.

29. The device of claim 1, wherein said photon absorbing material is present in a first layer of said device and said thermochromic material is present in a second layer of said device, and wherein said first and second layers are adjacent to each other.

30. The device of claim 1, wherein said photon absorbing material converts absorbed photons to heat in less than 0.1 nanoseconds.

31. The device of claim 1, wherein said photon absorbing material converts absorbed photons to heat in less than 0.01 nanoseconds.

32. The device of claim 1, wherein said photon absorbing material converts absorbed photons to heat in less than 0.001 nanoseconds.

33. The device of claim 1, wherein said photon absorbing material onverts absorbed photons to heat in less than 0.0002 nanoseconds.

34. The device of claim 1, which further comprises one or more optical limiting materials selected from the group consisting of: second order nonlinear optical materials and third order nonlinear optical materials.

35. The device of claim 34, wherein said optical limiting material comprises a reverse saturable absorber.

* * * * *